Feb. 22, 1938.    E. J. M. BRINCK ET AL    2,109,284
SLACK ADJUSTER FOR MOTOR VEHICLE BRAKES
Filed Oct. 22, 1936    3 Sheets-Sheet 1

Inventor:
Erik J.M. Brinck
Rune V.A. Olsson
By [signature]
Atty.

Feb. 22, 1938.   E. J. M. BRINCK ET AL   2,109,284
SLACK ADJUSTER FOR MOTOR VEHICLE BRAKES
Filed Oct. 22, 1936   3 Sheets-Sheet 2

Inventor
Erik J. M. Brinck
Rune A. Olsson
by Atty.

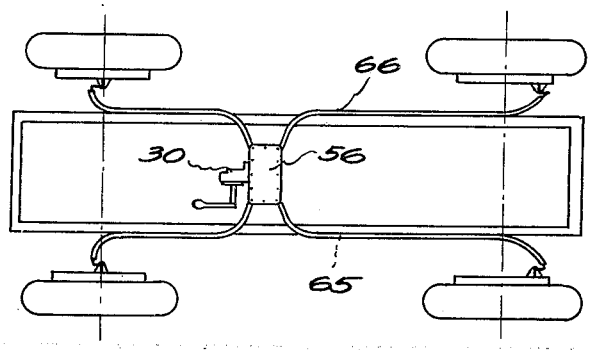
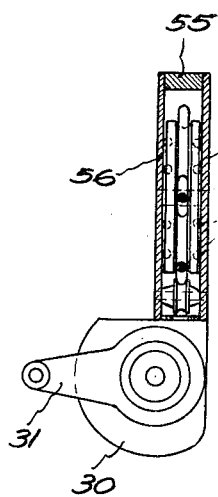
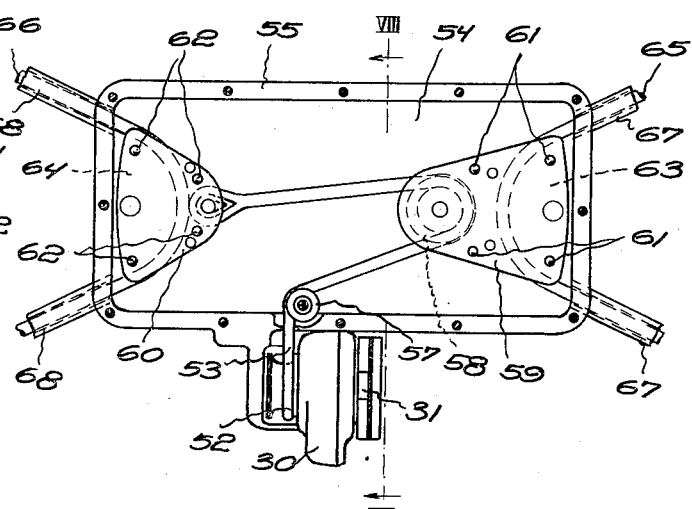

Patented Feb. 22, 1938

2,109,284

UNITED STATES PATENT OFFICE 2,109,284

SLACK ADJUSTER FOR MOTOR VEHICLE BRAKES

Erik Johan Mårten Brinck, Solvesborg, and Rune Viktor Augustus Olsson, Kyrkhult, Sweden Application October 22, 1936, Serial No. 107,080
In Sweden October 24, 1935

8 Claims. (Cl. 188—196)

This invention relates to automatic slack adjusters for vehicle brakes, especially motor car brakes.

By means of the improved slack adjusters it is possible to maintain a constant slack in all the brakes regardless of wear of the braking surfaces, and the brake lever always will occupy the same position when the brakes are released.

In vehicle brakes, and especially in motor car brakes, it is very important that an equal and correct braking power is applied to all of the brakes. Therefore, it is necessary to adjust all the brakes on the wheels for the same slack, and owing to the wear of the brakes an adjustment is also required from time to time for maintaining the slack constant.

Slack adjusting devices have been proposed in which said adjustment of the brakes can be obtained automatically. Either a separate adjusting device has been housed in each individual brake, or an adjusting device has been disposed in the lever system or rigging connecting the brake pedal or hand operated brake lever with the brake shoes, in which latter case one and the same adjusting device has been common to all the individual brakes.

The known devices of the type referred to, however, suffer from the drawback, among others, that the intentional movement of the movable parts thereof in relation to each other encounters a great frictional resistance so that great power must be available to perform the adjustment of the device according to the wear of the brakes, and besides there has been some difficulty involved in enclosing the various parts of the adjusting device in a housing for protecting the same.

The primary object of the present invention is to provide a slack adjuster having parts of a simplified construction and in which the movable parts are easily movable in relation to each other in the desired direction and are fully enclosed in a housing which may be filled with a fluid lubricant.

Another object of the invention is to improve the construction and arrangement of certain details in the new device, as the pawl means, so as to make these details effective for transmitting considerable power quantities in a reliable manner.

Still another object of the invention is to further improve the slack adjuster by providing an equalizing mechanism permitting the required braking power to be properly transmitted to all the brakes when only one single slack adjuster is used for all the brakes of the vehicle and when these brakes are unevenly worn, thereby allowing a comparatively thick brake lining to be fully worn out without the necessity of any intervening manual adjustments.

In order that the invention may be clearly understood it is hereinafter described with reference to the accompanying drawings, in which:—

Fig. 6 illustrates the slack adjuster of Figs. 3–5 in combination with an equalizing mechanism mounted in a motor car shown diagrammatically.

Fig. 7 is an enlarged view of the slack adjuster and the equalizing mechanism of Fig. 6 with the cover removed from the latter.

Fig. 8 is a section on the line VIII—VIII of Fig. 7.

Figure 1:
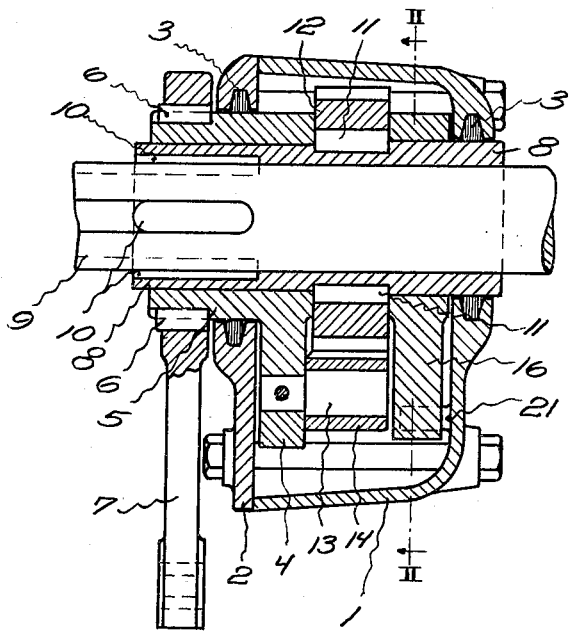
Fig. 1 is a longitudinal section of the slack adjuster according to the invention.
Figure 2:
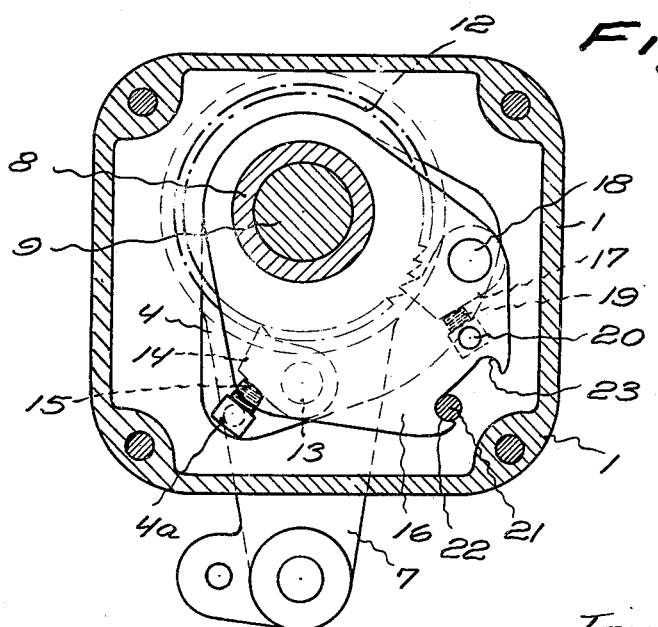
Fig. 2 is a section on the line II—II of Fig. 1.

In the form of Figs. 1 and 2 the slack adjusting device comprises a housing I closed at one end with a cover 2. The cover 2 and the opposite end wall of the housing are provided with journal openings provided with tightening means 3. Within the housing there is an arm 4 carried on a hollow member 5 which is journaled in the journal opening of the cover 2 and provided with a projecting end having secured thereto by means of wedges 6 an arm 7. This arm 7 is adapted to be connected by means of links or the like to a brake actuating lever which may consist of the usual brake pedal or of a hand operated brake lever. A sleeve 8 extends through the housing I and is journaled in the hollow member 5 and in the journal opening of the remote end wall of the housing, and by means of this sleeve 8 the whole device is mounted on a brake shaft 9. This brake shaft may consist of the usual brake shaft which is disposed substantially at the middle of the vehicle and transversely to the longitudinal axis thereof and to which the brake shoes of the brakes at the individual wheels of the vehicle are connected by means of links and levers or the like. The sleeve 8 is secured against rotation relatively to the rotatable shaft 9 by means of wedges 10 or the like. The housing I is adapted to be secured to some part of the vehicle frame for preventing rotation of the housing around the shaft 9. Secured on the sleeve 8 within the housing 1 by means of wedges 11 or the like is a ratchet wheel 12, and pivotally mounted on a pin 13 carried by the arm 4 there is a pawl 14 for cooperation with the ratchet wheel. The pawl 14 is resiliently pressed against the teeth of the ratchet wheel by means of a spring 15 disposed between the pawl and a projection 4a on the arm 4. The ratchet wheel 12 is disposed between the arm 4 and an arm 16 carrying a slack controlling pawl 17 cooperating with the ratchet wheel 12. The arm 16 is rotatably mounted within the housing on the sleeve 8, and the pawl 17 is pivoted on a pin 18 carried on the arm 16. The pawl 17 is resiliently pressed against the teeth of the ratchet wheel 12 by means of a spring 19 disposed between the pawl and a projection 20 on the arm 16. The teeth of the ratchet wheel are inclined in the direction opposite to the direction in which the arm 7 and thereby the arm 4 is rotated for applying the brakes at a braking operation. In the housing there is an abutment pin 21 for cooperation with two opposed abutment ears 22 and 23 on the arm 16 carrying the slack controlling pawl 17, so that the rotation of the arm 16 is limited in both directions. The range within the two limits, that is the distance between the two ears 22 and 23, corresponds to the desired normal value of the slack of the brakes. The said range may be adjustable, if desired, by making one or both of the abutments 22 and 23 adjustable.

The device operates as follows: At a braking operation the arm 7 is swung in clockwise direction as viewed in Fig. 2 and thereby causes also the arm 4 to be displaced in the same direction and to carry with it by means of the pawl 14 the ratchet wheel 12 and the parts connected therewith, viz. the sleeve 8 and the transverse brake shaft 9. The movement is transmitted from the shaft 9 to all the brake shoes, which thereby are caused to engage the wheel drums, so that braking will take place. After braking has been carried out the driving shaft and the operating lever are returned to their original positions in a manner known per se by spring actuated means and, if the brakes have the correct amount of slack, there will be no adjustment in the positions of the parts of the slack adjuster in relation to each other.

If the brake shoes are now assumed to be worn-out in a certain degree, the result is, however, that at a braking operation the shoes have to move a greater distance before engaging the brake drum. Hence, the parts connected with the shoes which parts include the ratchet wheel 12, will also move a greater distance. When braking is to take place the ratchet wheel 12 is rotated in clockwise direction as viewed in Fig. 2, and the arm 16 carrying the slack controlling pawl 17 is also rotated in the same direction, but in the case now assumed, where a greater amount of slack is present, so that the parts must rotate a greater angle before the brakes are completely applied, the abutment ear 23 will come into contact with the pin 21, whereby further displacement of the arm 16 carrying the controlling pawl 17 is prevented, and the pawl 17 will then run over the teeth of the ratchet wheel 12. On releasing the brakes after braking has taken place the ratchet wheel 12 moves in counter-clockwise direction carrying with it the arm 16 until its other abutment ear 22 strikes the pin 21, whereby further displacement in the same direction of the arm 16 and thereby also of the ratchet wheel 12 is prevented, because the pawl 17 prevents relative movement between the arm 16 and the ratchet wheel 12 to take place in this direction. When the ratchet wheel 12 stops its movement, the movement of the brake shoes also ceases, so that the slack will not be greater than desired. Because the ratchet wheel 12 at the return movement (corresponding to the release of the brakes) in this case, when the shoes have undergone considerable wear, does not rotate the same angle as at the application of the brakes, the arms 4 and 7 will not have reached their original positions when the ratchet wheel 12 stops. However, the arm 7, or the brake actuating lever to which it is connected, is spring actuated in a manner known per se, so that it will be returned to its original position. Such return movement can take place since the pawl 14 can run over the teeth of the ratchet wheel 12 in this direction.

Figure 3:
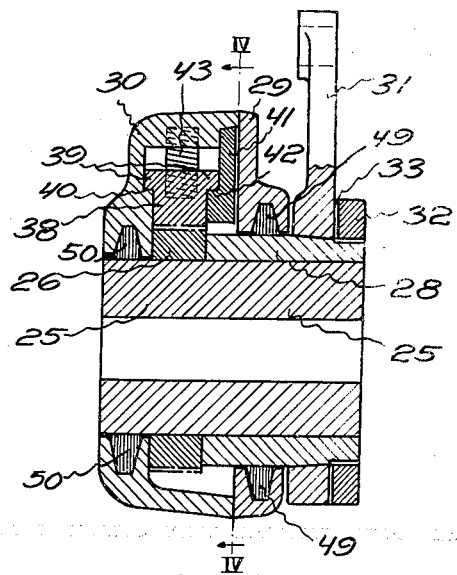
Fig. 3 is a longitudinal section of a modification of Fig. 1.
Figure 4:
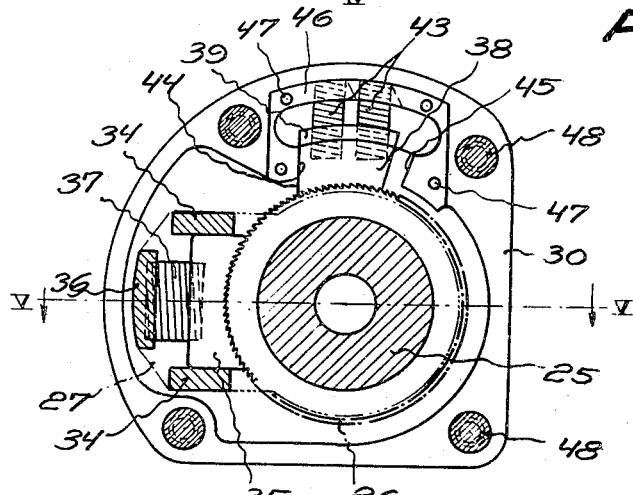
Fig. 4 is a section on the line IV—IV of Fig. 3.
Figure 5:
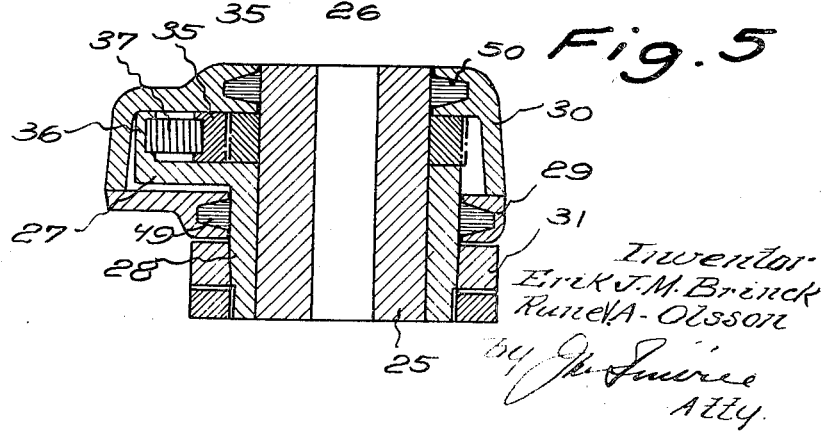
Fig. 5 is a section on the line V—V of Fig. 4.

According to the modification shown in Figs. 3-5 there is a sleeve 25 provided with a central bore for firmly securing the sleeve on a brake shaft not shown. This shaft may be directly or indirectly connected to the brake cam or the like by means of which the brake shoes are applied. The wall of the sleeve 25 is comparatively thick, thereby allowing the central bore to be further bored out in the case a shaft having a greater diameter is used. A toothed ratchet wheel 26 is firmly secured by means of wedges on the sleeve 25. An arm 27 is carried on a hollow member 28 rotatably mounted on the sleeve 25, and provided with an end projecting through an opening in a cover 29 closing one end of a housing 30 enclosing the working parts of the slack adjuster. An arm 31 is firmly clamped on a conical portion of the projecting end of the hollow member 28 and is secured thereon by means of a washer 33 and a nut 32. The arm 27 is provided with a pair of guides 34, 34, Fig. 4, and therebetween is a slidable pawl or catch 35 having a comparatively great number of teeth adapted to be brought into engagement with the ratchet wheel 26. The arm 27 is also provided with a projecting member 36 offering a support for a helical spring 37 which engages the member 35 and presses the latter radially against the ratchet wheel. The guides 34 are located substantially in a horizontal plane and due to this arrangement they will absorb the forces of inertia accumulated on the member 35 during the swinging motion of the vehicle in the vertical direction. Thus these forces of inertia are not absorbed by the spring 37, in which case the member 35 might have lost its engagement with the ratchet wheel.

The turning movement of the ratchet wheel is limited at the release of the brakes by a second pawl or catch 38 located in a recess in the housing 30. By means of a pair of curved ribs 39 the member 38 rests on a curved track 40 on the end wall of the housing and on a similar curved track 42 on a plate 41 secured in the housing, and said tracks serve to guide the member 38 and allow a sliding motion thereof. A pair of helical springs 43 holds the member 38 in engagement with the tracks 40, 42, and the sliding motion of the member 38 along the tracks 40, 42 is limited by means of a pair of abutments 44, 45 which may be adjustably arranged. When the member 38 abuts the abutment 44 the ratchet wheel cannot rotate in a direction corresponding to a further release of the brake shoes, and when the member 38 abuts the abutment 45 the member 38 is brought out of engagement with the ratchet wheel 26 if the latter is rotated further in the direction for applying the brakes. The housing 30 is provided with a recess 46 for the plates 41 and with threaded holes 47 for screws for securing the plate 41 which, for the sake of clearness, is removed in the section shown in Fig. 4. The cover 29 is secured to the housing 30 by means of bolts 48, and these bolts 48 also may be used for securing the whole aggregate on the vehicle. The cover 29 and the housing 30 are arranged fluid tight in relation to the hollow member 28 and the sleeve 25, respectively, by means of suitable packings 49, 50.

The operation of the apparatus now described corresponds to that of Figs. 1 and 2. If the lining of the brake shoes has been worn to such an extent that the shoes during braking have to move a greater distance before engaging the brake drum, then the brake shaft together with the ratchet wheel 26, which is firmly secured to said shaft, also has to move a greater distance. When braking is to take place the ratchet wheel 26 is rotated in clockwise direction, as viewed in Fig. 4, and the member 38 partakes in the rotation. During this rotation, however, the member 38 abuts the abutment 45, and this results in that a further rotation of the member 38 is prevented and in that the member is brought out of engagement with the teeth of the ratchet wheel at further rotation of the latter. On releasing the brakes after braking the ratchet wheel moves in a counter-clockwise direction as viewed in Fig. 4, and the member 38 partakes in the movement until it abuts the abutment 44 when further displacement of the member 38 and the ratchet wheel together with its associated parts is prevented in this direction. As soon as the movement of the ratchet wheel and the brake shaft stops, the movement of the brake shoes also ceases, so that the slack will not be greater than desired. Because the ratchet wheel in this case (and when the shoes have undergone considerable wear) during release of the brakes does not rotate the same angle as when the brakes are being applied, the arms 27 and 31 will not have reached their original positions when the ratchet wheel stops. The said arms, however, can be returned under the action of the return spring of the brake to the original position since the pawl 35 under compression of the spring 37 will run over one or more teeth of the ratchet wheel.

On Fig. 6 the modified slack adjuster of Figs. 3–5 is shown mounted on the central portion of the chassis of a motor car 51, and in combination with this slack adjuster there is an equalizing device, being shown in detail in Figs. 7 and 8. To the central sleeve 25 of the slack adjuster, or to a shaft secured in said sleeve, there is secured a wire pulley 52 with a wire 53 thereon which extends into a box-shaped housing to which the housing 30 is secured. The bottom 54 of the box-shaped housing is formed from a steel plate, the side walls are of light metal and the top 56 consists of a steel plate parallel with the bottom plate. The wire 53 extends into the housing 54—56 over a roll 57, supported in said housing, and over a second roll 58 carried by a floating member 59, and the end of the wire is secured to a second floating member 60. Each of the two floating members is formed from two plates with a certain space therebetween and with balls 61, 62 in countersunk holes on the plates. The floating members are freely movable in the box-shaped housing on the balls 61, 62 which contact the top and the bottom walls of the housing. In the space between the plates of the floating members 59, 60 are segments 63 and 64 for guiding the wires 65 and 66 the ends of which are secured to the operating members in the respective brakes. The two wires 65, 66 are protected by tubings 67, 68.

The operation of the equalizing device is as follows:—When the arm 31 is actuated for applying the brakes the pulley 52 is rotated and the wire 53 is wound around the pulley, thereby drawing the floating members 59, 60 close to each other and stretching the wires 65, 66 at which braking will take place. The floating members 59, 60 are spaced apart again as soon as the stretching of the wire 53 ceases, which takes place when the arm 31 is brought back to its original position. In order to facilitate the return movement of the members 59, 60 at release of the brakes there may be provided a compression spring between the two members.

It is obvious in case of unevenly worn brakes that the floating member in engagement with the wire connected to the most worn brake will change its position in relation to the other floating member without any variation of the tension of the wires 65, 66, since said tension is the same in both wires and is fully independent of the wear of the brakes. Due to the fact that the wire 53 can be wound around the pulley 52 it is also possible to increase the movement of the brake cam or the like, which means that brake linings of increased thickness can be used in the brakes.

What we claim and desire to secure by Letters Patent is:—

1. In an automatic slack adjusting device for vehicles of the character described, a housing provided in its opposite end walls with aligned journal openings, two concentric and relatively rotatable members rotatably mounted in said housing and journaled each in one of said openings, a toothed ratchet wheel disposed within the housing and firmly secured on one of said rotatable members, a pawl carried within the housing on the other of said rotatable members and adapted to cooperate with the said ratchet wheel, and a second pawl disposed within the housing and also adapted to cooperate with the said ratchet wheel and movable within predetermined limits together with the ratchet wheel, the teeth of the ratchet wheel being inclined in the direction opposite to the direction in which the ratchet wheel is intended to be rotated at brake application movement.

2. In an automatic slack adjusting device for vehicle brakes of the character described, a housing having a removable cover at one end and an end wall at the opposite end, said cover and end wall being provided with aligned openings, a rotatable hollow member disposed within said housing and having an end portion projecting through the opening in said cover, packing means for said rotatable member in said opening, an arm secured on the projecting end of said rotatable member, a second rotatable member journaled within the firstmentioned hollow rotatable member fitting the opening in the end wall of the housing, packing means for the secondmentioned rotatable member in said opening, a ratchet wheel disposed within the housing and firmly secured on the secondmentioned rotatable member, an arm disposed within the housing and firmly carried on the firstmentioned rotatable member, a pawl carried on said lastmentioned arm and adapted to cooperate with the ratchet wheel, a second pawl disposed within the housing and adapted to cooperate with the ratchet wheel and movable therewith within predetermined limits, the teeth of the ratchet wheel being inclined in the direction opposite to the direction in which the ratchet wheel is intended to be rotated at brake application movement.

3. An automatic slack adjusting device as claimed in claim 1, in which the second pawl is carried on an arm rotatably mounted around the axis of the ratchet wheel within the housing, and in which this arm cooperates with a fixed stop in the housing for limiting rotation of the arm in both directions.

4. An automatic slack aduster as claimed in claim 2, in which the second pawl is carried on an arm rotatably mounted around the axis of the ratchet wheel within the housing, and in which this arm cooperates with a fixed stop in the housing for limiting rotation of the arm in both directions.

5. An automatic slack adjuster as claimed in claim 1, in which the second pawl is slidably mounted in guides in the housing so as to allow the pawl to partake in the movement of the ratchet wheel within predetermined limits in both directions.

6. An automatic slack adjuster as claimed in claim 2, in which the second pawl is slidably mounted in guides in the housing so as to allow the pawl to partake in the movement of the ratchet wheel within predetermined limits in both directions.

7. In an automatic slack adjusting device for vehicle brakes of the character described, a housing having aligned journal openings at opposite ends, two concentric and relatively rotatable members mounted in said housing and projecting through the opposite journal openings thereof, a ratchet wheel disposed in said housing and firmly secured to one of said rotatable members, a pawl carried on the other of said rotatable members and adapted to cooperate with the ratchet wheel, a second pawl adapted to cooperate with the ratchet wheel and movable therewith within predetermined limits in both directions, an arm secured on the projecting end on the secondmentioned rotatable member and adapted to be acted upon from a brake pedal or the like, a wire pulley connected with the projecting end of the firstmentioned rotatable member, two floating members, a wire interconnecting said floating members and running to the said pulley, and wires for connecting said floating members with the brakes.

8. A device as claimed in claim 7, in which the floating members are enclosed in a box-like casing, and in which the housing is secured to this casing.

ERIK JOHAN MÅRTEN BRINCK.
RUNE VIKTOR AUGUSTUS OLSSON.